(No Model.)
F. B. HARVEY.
CULTIVATOR TOOTH.
No. 499,991. Patented June 20, 1893.
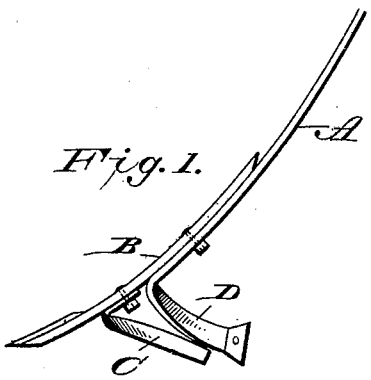
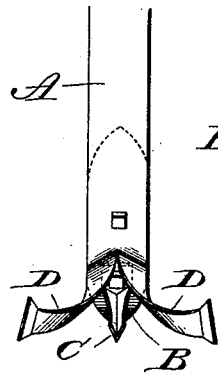
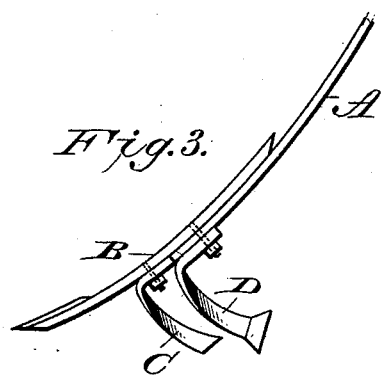
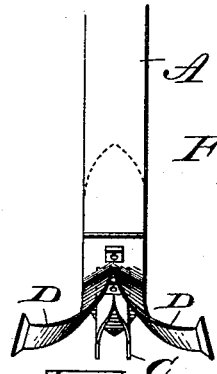
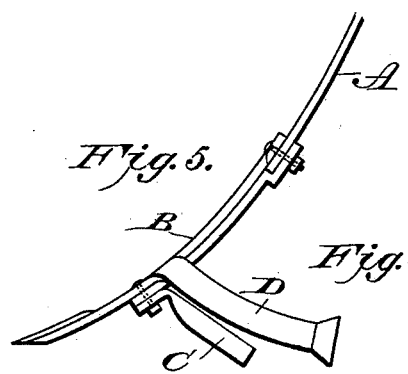
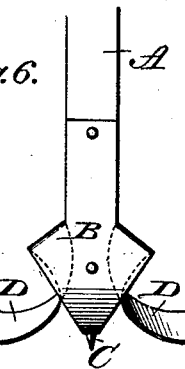
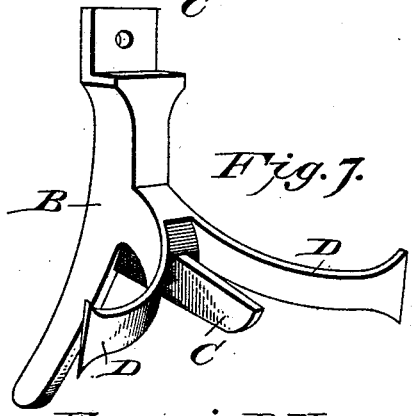
Witnesses
Francis B. Harvey,
Inventor
by
Attorney

UNITED STATES PATENT OFFICE.

FRANCIS B. HARVEY, OF ATGLEN, PENNSYLVANIA.

CULTIVATOR-TOOTH.

SPECIFICATION forming part of Letters Patent No. 499,991, dated June 20, 1893.

Application filed October 14, 1892. Serial No. 448,885. (No model.)

*To all whom it may concern:*

Be it known that I, FRANCIS B. HARVEY, a citizen of the United States of America, residing at Atglen, in the county of Chester and State of Pennsylvania, have invented certain new and useful Improvements in Cultivator-Teeth; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in cultivator or harrow teeth.

The object of the invention is to provide a cultivator or harrow tooth having rear of the point a rearwardly and downwardly projecting portion which is adapted to enter the soil and make a furrow therein, deeper than that made in the soil by the point, said tooth also being provided with laterally extended portions which diverge rearwardly and upwardly, as will be hereinafter fully set forth and particularly pointed out in the claims.

In the accompanying drawings forming part of this specification: Figure 1 is a side view of a tooth showing my improvements applied thereto. Fig. 2 is a rear elevation of the same. Fig. 3 is a side view showing a modified form of the rearwardly projecting portion. Fig. 4 is a rear elevation of Fig. 3. Fig. 5 is a side elevation showing a cultivator blade with a backing plate, said blade and backing plate being secured to a spring support. Fig. 6 is a front elevation of the form shown in Fig. 5. Fig. 7 is a modification showing the tooth formed of a single piece.

A designates a spring support, the upper end of which may be provided with means for attaching the same to a cultivator frame or harrow frame.

B designates the body portion of the tooth, the front of which is preferably inclined forwardly. Rear of the portion B and at a suitable distance above the same is located a rearwardly projecting portion C, which is on a line with the point, or shovel, the rear end of the same being positioned to extend below the point or shovel and above this rearwardly projecting portion are laterally, downwardly and rearwardly extended members D D, the ends of which are adapted to enter the soil and turn the same. The combination of these three parts when attached to a spring support forms the essential feature of my invention, and it is obvious that said combination is susceptible of numerous modifications; for instance, in Figs. 1 and 2 of the drawings I have shown the tooth or cultivator blade provided with two apertures, and in this case the point or blade may be reversed as the apertures are equi-distant from the ends. One of the bolts serves to secure the spring support A to the blade and the other connects thereto the rearwardly and downwardly projecting portion C. In this instance the rearwardly, downwardly and laterally projecting portions D D of the tooth B are formed integral with the spring support A. In Figs. 3 and 4 a similar blade or shovel B is employed, but in this instance the rearwardly, downwardly and laterally diverging members D are formed separate and are bolted to the spring support A and blade or shovel B.

In Fig. 5 the rearwardly, downwardly and laterally diverging members D are formed integral with the blade point or shovel and a reinforcing or backing plate is attached to the rear side of the upper portion of the blade, or shovel the rearwardly and downwardly projecting portion C is secured thereto and to the blade or shovel by a bolt.

In Fig. 7 the parts may be formed integral and attached to the spring A by a bolt.

By providing a cultivator blade with a rearwardly and downwardly projecting member which is rear of the point but normally below the same said member will contact with the ground when there is but little pressure on the point; but as said point enters the ground and the spring support is bent the rearwardly and downwardly projecting member will be elevated. By this construction a central stirring up or agitation of the ground is assured.

I do not wish to confine myself to any specific form of the rearwardly projecting member C, as the shape and construction of the same may be varied.

In operation a harrow or cultivator provided with teeth constructed as shown in the accompanying drawings, the point of the tooth being normally above the rearwardly extending portion C, the tooth operates as follows: In light soil the spring support A will be bent to a very small degree and the rearwardly extending portion C will enter the soil deeper than the point B to form a depression or ridge, which is very desirable in sowing seed, as the seed can fall in the soil where it is firm, such soil retaining moisture to a greater extent than soil which has been loosened. When the soil is stiff and firm the spring support A will be bent and a furrow or ridge will be formed in said stiff soil in the usual manner. In either instance the soil is broken up on each side of the furrow or depression by the rearwardly, downwardly and laterally diverging members D D. By means of a tooth thus constructed it will not be necessary to adjust or rearrange the spring support for different characters of soil.

Having thus described my invention, what I claim as new, and desire to secure by Letters Patent, is—

1. In combination, with a spring support A, a harrow or cultivator tooth attached to the lower or free end of said spring support and comprising a point or shovel B, a downwardly and rearwardly projecting portion C rear of said point or shovel and diverging wings D D which extend downwardly and rearwardly, substantially as shown.

2. In a cultivator or harrow tooth, the combination, of a spring or resilient support A, a tooth adapted to be secured thereto comprising a point or blade, rearwardly and laterally diverging portions or wings and a rearwardly extending central portion on a line with the blade or shovel, the lower end thereof being below the lower end of the point or shovel and rear of said point or shovel, substantially as shown, and for the purpose set forth.

3. In combination with a spring support, as A, a tooth therefor comprising a point or blade, a central rearwardly and downwardly projecting member attached to said point or blade above the lower end thereof so that the rear end will extend below the point of the blade or shovel, rearwardly diverging portions or wings bent or shaped substantially as shown.

In testimony whereof I affix my signature in presence of two witnesses.

FRANCIS B. HARVEY.

Witnesses:
S. E. WEBER,
ISAAC RINEHART.